(12) United States Patent
Davis et al.

(10) Patent No.: US 9,617,133 B2
(45) Date of Patent: Apr. 11, 2017

(54) PORTABLE SUPPORT PLATFORM SYSTEM

(71) Applicant: TAIT TOWERS, INC., Lititz, PA (US)

(72) Inventors: Adam Davis, Leola, PA (US); Tyler Kicera, Manheim, PA (US)

(73) Assignee: Tait Towers Manufacturing, LLC, Lititz, PA (US)

( * ) Notice: Subject to any disclaimer, the term of this patent is extended or adjusted under 35 U.S.C. 154(b) by 353 days.

(21) Appl. No.: 13/707,156

(22) Filed: Dec. 6, 2012

(65) Prior Publication Data
US 2014/0158959 A1 Jun. 12, 2014

(51) Int. Cl.
| | |
|---|---|
| *B66F 11/00* | (2006.01) |
| *F16M 13/02* | (2006.01) |
| *F16M 11/10* | (2006.01) |
| *F16M 11/18* | (2006.01) |
| *F16M 11/24* | (2006.01) |
| *F16M 11/42* | (2006.01) |
| *F21V 21/15* | (2006.01) |
| *F21W 131/406* | (2006.01) |

(52) U.S. Cl.
CPC ............ *B66F 11/00* (2013.01); *F16M 11/10* (2013.01); *F16M 11/18* (2013.01); *F16M 11/24* (2013.01); *F16M 11/425* (2013.01); *F16M 13/027* (2013.01); *F21V 21/15* (2013.01); *F21W 2131/406* (2013.01); *Y10T 29/49826* (2015.01)

(58) Field of Classification Search
CPC ......... B66C 1/125; B66D 1/39; F21V 21/008; F21V 21/15; F21V 21/16; F21V 21/38; B66F 11/00; F21W 2131/406; F16M 11/10; F16M 11/18; F16M 11/24; F16M 11/425; F16M 13/027
See application file for complete search history.

(56) References Cited

U.S. PATENT DOCUMENTS

| | | | | |
|---|---|---|---|---|
| 2,334,139 | A | * 11/1943 | Wilson | .......... F21V 21/38 200/2 |
| 3,254,913 | A | * 6/1966 | Young | .......... 294/82.12 |
| 5,361,565 | A | * 11/1994 | Bayer | .......... 254/292 |
| 6,203,172 | B1 | * 3/2001 | Wanuch | .......... F21V 23/02 362/225 |

(Continued)

FOREIGN PATENT DOCUMENTS

DE 2655245 A * 6/1978

OTHER PUBLICATIONS

English Translation of DE 2655245 A.*

*Primary Examiner* — Sang Kim
*Assistant Examiner* — Nathaniel Adams
(74) *Attorney, Agent, or Firm* — McNees Wallace & Nurick LLC (57) ABSTRACT

A portable support platform system and method for assembling the system are provided. The portable support platform system includes a support platform configured to receive theatrical devices and an orientation member attached to the support platform. The orientation member includes an arcuate surface configured to receive a flexible member. The flexible member is fixably attached to the orientation member at one or more locations along the arcuate surface to permit orientation and movement of the support platform when the flexible members are deployed or retracted.

3 Claims, 8 Drawing Sheets

(56) References Cited

U.S. PATENT DOCUMENTS

| | | | |
|---|---|---|---|
| 6,450,668 B1* | 9/2002 | Kotloff | F21S 8/06 362/221 |
| 6,894,621 B2* | 5/2005 | Shaw | B66C 13/44 212/276 |
| 7,597,175 B2* | 10/2009 | Reed | A62B 1/02 182/142 |
| 2003/0137835 A1* | 7/2003 | Mier-Langner | F21S 8/06 362/220 |

* cited by examiner

PORTABLE SUPPORT PLATFORM SYSTEM

FIELD OF THE INVENTION

The present invention is directed to display systems and structures for supporting the same. More specifically, the present invention relates to a portable structure for supporting theatrical devices, such as, audio, visual, lighting and other multi-media components, retracted and deployed by a flexible member to any desired configuration.

BACKGROUND OF THE INVENTION

Productions featuring famous bands or other music stars, as well as musicals, plays, and other forms of entertainment are often touring productions. These productions typically appear at a particular venue in a particular city for a limited time, often just a single show on a single night. Despite the limited nature of the engagements, the staging of such productions is usually complex and highly customized. As a result, shows generally travel with their own caravan of stage equipment that is assembled and disassembled at each stop along the tour.

Assembling and disassembling the stage and its associated equipment is time-consuming and generally entails many persons, often referred to as road-hands or "roadies," working many long hours. Furthermore, the tour schedule usually leaves little time to spare between performances making stage assembly/disassembly a race against the clock. Touring productions are usually very expensive to produce and additional costs can have an adverse effect on a production's overall profitability.

Often, the portable nature of the equipment for stage productions limits the flexibility of the performance of the equipment due to the way and the location where the components attach. For example, lighting may be attached to pre-existing structures in a particular venue. Generally, these structures lack the ability to move or provide motion to the equipment, making readjustments to any of the equipment difficult, especially during the performance. In addition, such support systems have limited flexibility in providing lighting or sound to specific locations or at specific angles and are subject to the limitations of the configuration of the particular venues.

While movable lighting, such as robotic lighting, provides some motion and flexibility, the motions are still limited by the location in which the light is mounted. In addition, the robotic lighting still requires individual installation of each light and has a limited range of motion and/or area of illumination.

What is needed is a portable structure for staged productions that provides flexible positioning of mounted equipment that is easily stored and transported and does not suffer from one or more of the drawbacks present in current staging equipment.

SUMMARY OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

Exemplary embodiments are directed to support structures for staged productions that allow theatrical devices, such as lights, speakers or other sound equipment, and other commonly used stage equipment to be easily stored, moved and/or oriented as a substantially unitary support structure.

One embodiment of the present disclosure includes a portable support platform system having a support platform configured to receive theatrical devices and an orientation member attached to the support platform. The orientation member includes an arcuate surface configured to receive a flexible member. The flexible member is fixably attached to the orientation member at one or more locations along the arcuate surface to permit orientation and movement of the support platform when the flexible members are deployed or retracted.

Another embodiment of the disclosure includes a method for assembling a portable support platform system. The method includes providing a portable support platform system having a support platform configured to receive theatrical devices and an orientation member attached to the support platform. The orientation member includes an arcuate surface configured to receive a flexible member. The flexible member is fixably attached to the orientation member at one or more locations along the arcuate surface. The method further includes orienting the support platform with a lifting device. The lifting device is capable of deploying or retracting the flexible member.

Other features and advantages of the present invention will be apparent from the following more detailed description of exemplary embodiments, taken in conjunction with the accompanying drawings which illustrate, by way of example, the principles of the invention.

BRIEF DESCRIPTION OF THE DRAWING

Wherever possible, the same reference numbers will be used throughout the drawings to represent the same parts.

DETAILED DESCRIPTION OF THE INVENTION

Exemplary embodiments are directed to portable support platform systems, particularly for staged productions that allow theatrical devices, such as lighting components, audio components, motion stabilizers and other commonly used stage equipment, to be positioned and/or oriented with the support structure. One advantage of an embodiment of the present disclosure is the ability to have multiple components such as lighting, audio and display items affixed to a support member for ease of assembly, operation, disassembly, storage and shipping. Yet another advantage of an embodiment of the present disclosure is that theatrical devices can be stored and/or deployed as a unit. This aids in storage and transport. In particular, the support platforms can easily fit and/or be stacked in the cargo space of a truck or other transportation vehicle. Another advantage of an embodiment of the present disclosure is the amount of time for which the theatrical devices can be deployed is greatly reduced and provides greater flexibility for positioning and/or orienting theatrical devices for use during a production. Yet another advantage of an embodiment of the present disclosure is the movement and orientation of the support platform allows a reproducible show, such as reproducible lighting effects, even in venues that have great variation in configuration.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Figure 1:
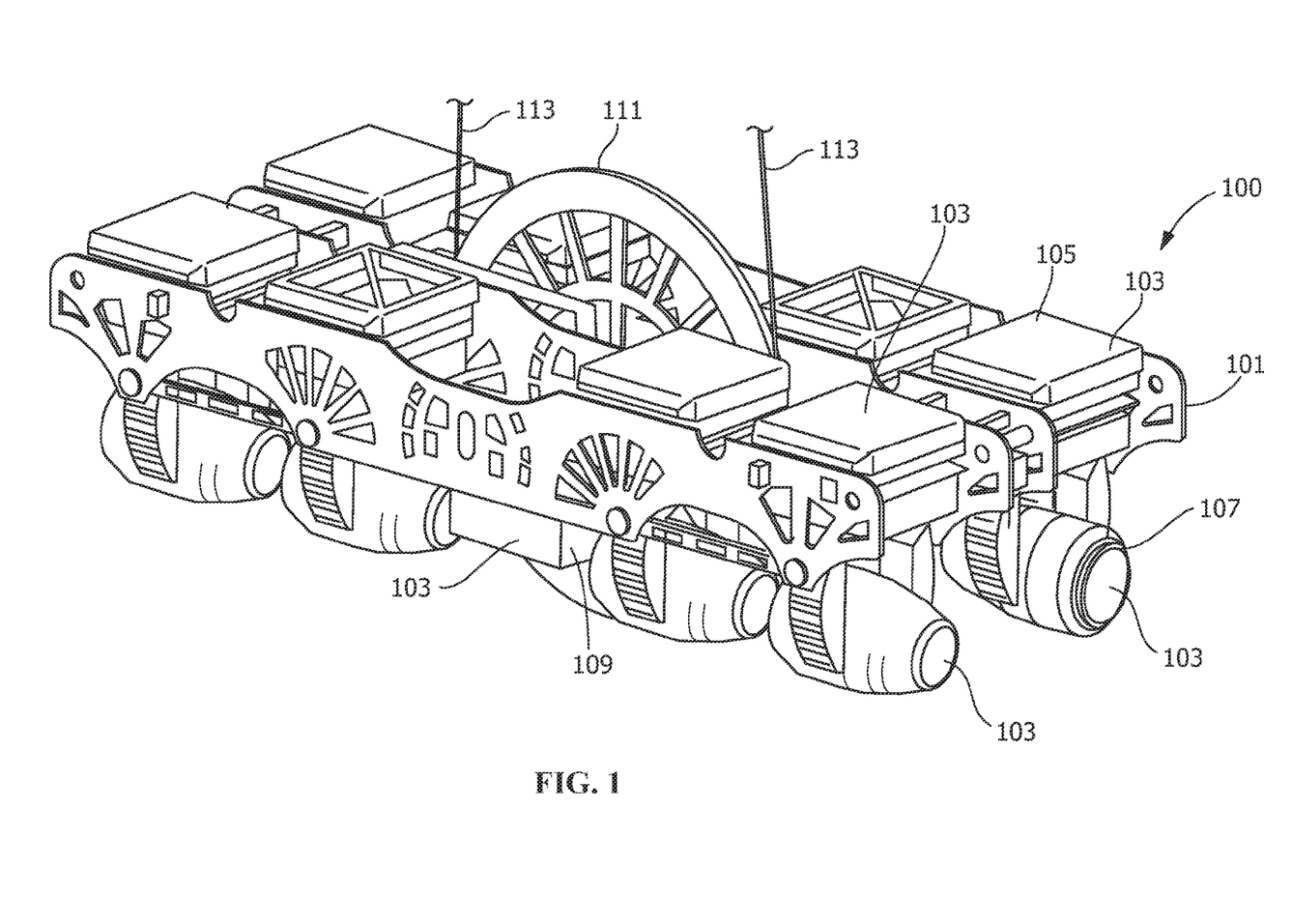
FIG. 1 is a perspective view of a portable support platform system in accordance with an exemplary embodiment.

FIG. 1 shows a portable support platform system 100 according to an embodiment of the present disclosure. Portable support platform system 100 includes a support platform 101 which is arranged to receive theatrical devices 103. Theatrical devices 103 include any devices useful for a staged production that require positioning and/or orientation. Non-limiting examples of theatrical devices 103 include, but are not limited to, lighting components, audio components, stabilization components or any other component requiring positioning and/or orientation for a staged production. Lighting components include any suitable lighting components known in the art for staged productions. Non-limiting examples of lighting components include, but are not limited to, spot lights, robotic lights, LED displays, directional lighting or any other lighting suitable for staged productions. Audio components include, but are not limited to, speakers, equipment, instruments or other audio components suitable for staged productions. Stabilizer components include components useful for limiting motion of portable support platform system 100. For example, the stabilizer components may be tethered, such as guide wire or rope anchors, or untethered, such as gyroscopic or other motion damping devices.

In one embodiment, as shown in FIG. 1, theatrical devices 103 include a stabilization component 105, a robotic lighting component 107 and a plurality of fixed lighting devices 109. Support platform 101 supports theatrical components 103.

In addition, support platform 101 preferably has a geometry that provides some protection or housing to theatrical devices 103 when stored and/or transported. In addition, support platform 101 preferably has a geometry and configuration to fit into a truck and/or for stacking on one another when multiple support platforms 101 are utilized for a staged production. Theatrical devices 103 may be fixed or may be movable. For example, robotic lighting component 107 is permitted to pivot and move while being mounted to support platform 101. Other components, such as the stabilization component 105, are fixed or otherwise stationary with respect to support platform 101.

As further shown in FIG. 1, support platform 101 is attached to an orientation member 111. One or more flexible members 113 are suspended from an architectural member 303 (see, for example, FIG. 3). Flexible members 113 engage the orientation member 111 and permit positioning and orientation of support platform 101. Flexible member 113 is any suitable flexible device. For example, suitable flexible members 113 include, but are not limited to, flexible tapes, ropes, wires, chains other suitable flexible structures, or combinations thereof.

Figure 2:
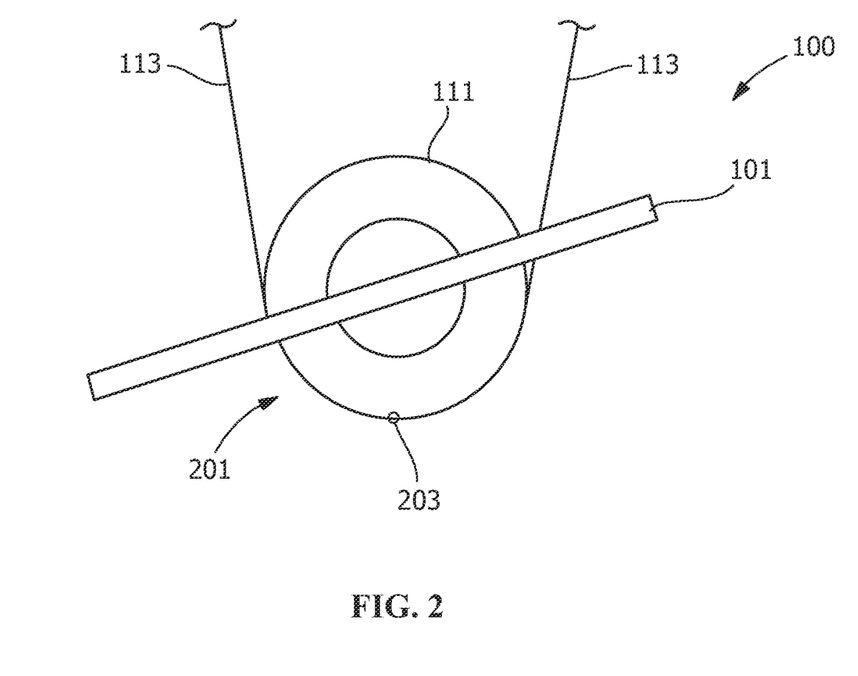
FIG. 2 is a schematic side view of the portable support platform system in a tilted orientation.

FIG. 2 is a schematic side view of portable support platform system 100 according to an embodiment of the present disclosure. As shown in FIG. 2, orientation member 111 includes an arcuate surface 201. Arcuate surface 201 is curved and provides a smooth rotation or pivoting of support platform 101 to orient support platform 101 and any theatrical devices 103 mounted thereon when flexible members 113 are retracted or deployed (see, for example, FIG. 1). Flexible member 113 is preferably in contact and detachable engagement with arcuate surface 201 over at least a portion of the length of arcuate surface 201. Arcuate surface 201 may be any suitable geometry for receiving flexible member 113 and includes, but is not limited to, grooves, features, teeth or any other geometry suitable for receiving flexible member 113 and supporting support platform 101. Flexible member 113 is fixably attached to orientation member 111 by at least one anchor location 203. The attachment of flexible member 113 to orientation member 111 is fixed to the extent that the attachment limits or prevents relative motion between orientation member 111 and flexible member 113 but permits the orientation and/or tilting of support platform 101. For example, while not so limited, the attachment of flexible member 113 may be accomplished by bolting, pinching, securing by adhesive, mechanically interlocking, or arranging in a chain sprocket arrangement. Multiple anchor locations 203 may be provided, for example, when a plurality of flexible members 113 are attached to orientation member 111. As shown in FIG. 2, flexible member 113 is continuous and attached at a single anchor location 203. However, multiple flexible member 113 segments may be used and preferably engage orientation member 111 along a substantial length of the arcuate surface 201.

Figure 3:
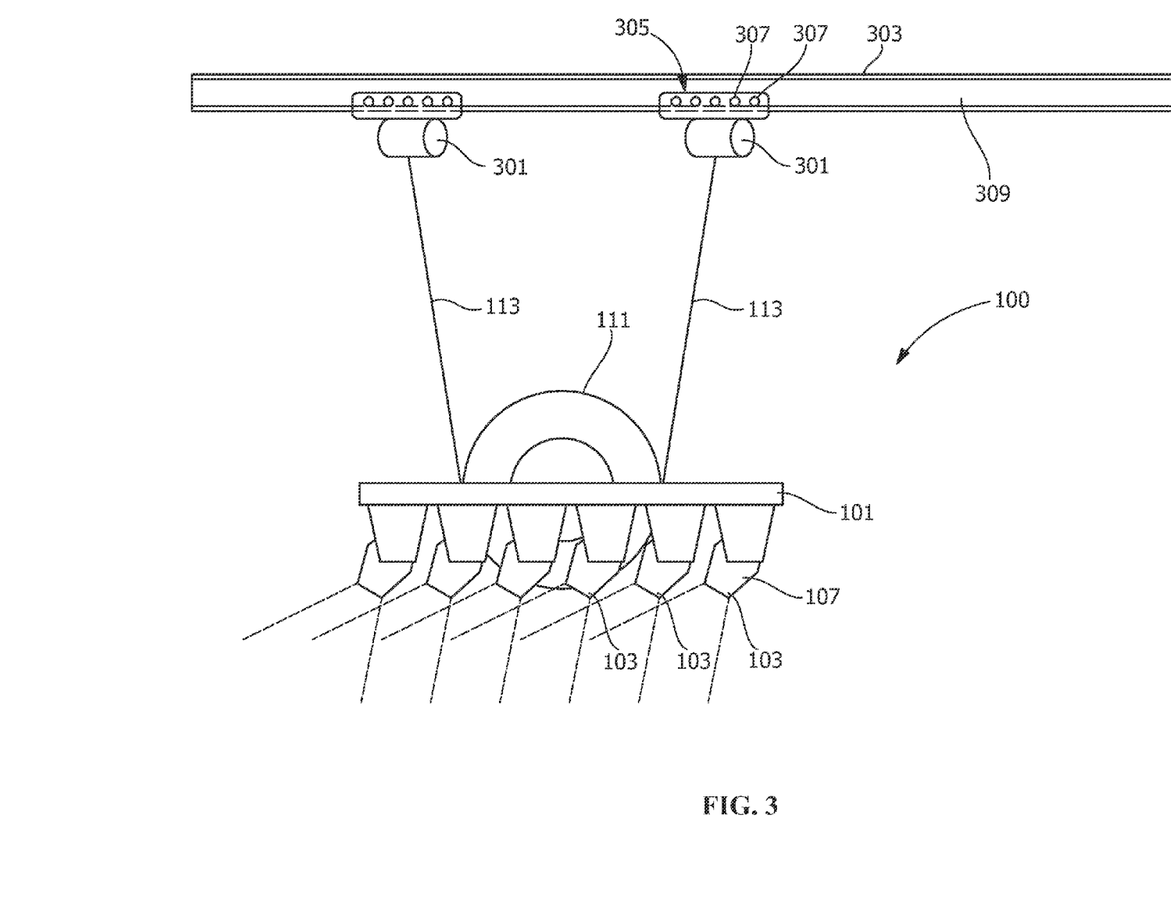
FIG. 3 is a schematic side view of the portable support platform system having theatrical devices mounted thereon in a first position.

FIG. 3 is a schematic side view of a portable support platform system 100 according to an embodiment of the present disclosure in a deployed position. As shown in FIG. 3, support platform 101 includes a plurality of theatrical devices 103 mounted thereon. In this embodiment, theatrical devices 103 are robotic lighting components 107, which are shown directing light. While FIG. 3 shows the robotic lighting components 107 directing light in a similar direction, these components may independently provide lighting direction according to the lighting needs of the show. Flexible members 113 extend to lifting devices 301 suspended from an architectural member 303. Examples, of architectural member 303, include, but are not limited to, an existing stage system, a roofing support system, another cable, a bridge, a wall, a telephone post, a trestle, a truss, other suitable type of architectural system, or combinations thereof. As shown in FIG. 3, in one embodiment, architectural member 303 is a truss suspended in a venue for a staged production. As shown in FIG. 3, flexible member 113 is a weight-bearing cable suspended from an architectural member 303. Lifting devices 301 include any suitable device for retracting or deploying a flexible member 113. Suitable lifting devices include, but are not limited to, winches, motors, chain drives or other lifting devices known in the art.

Figure 4:
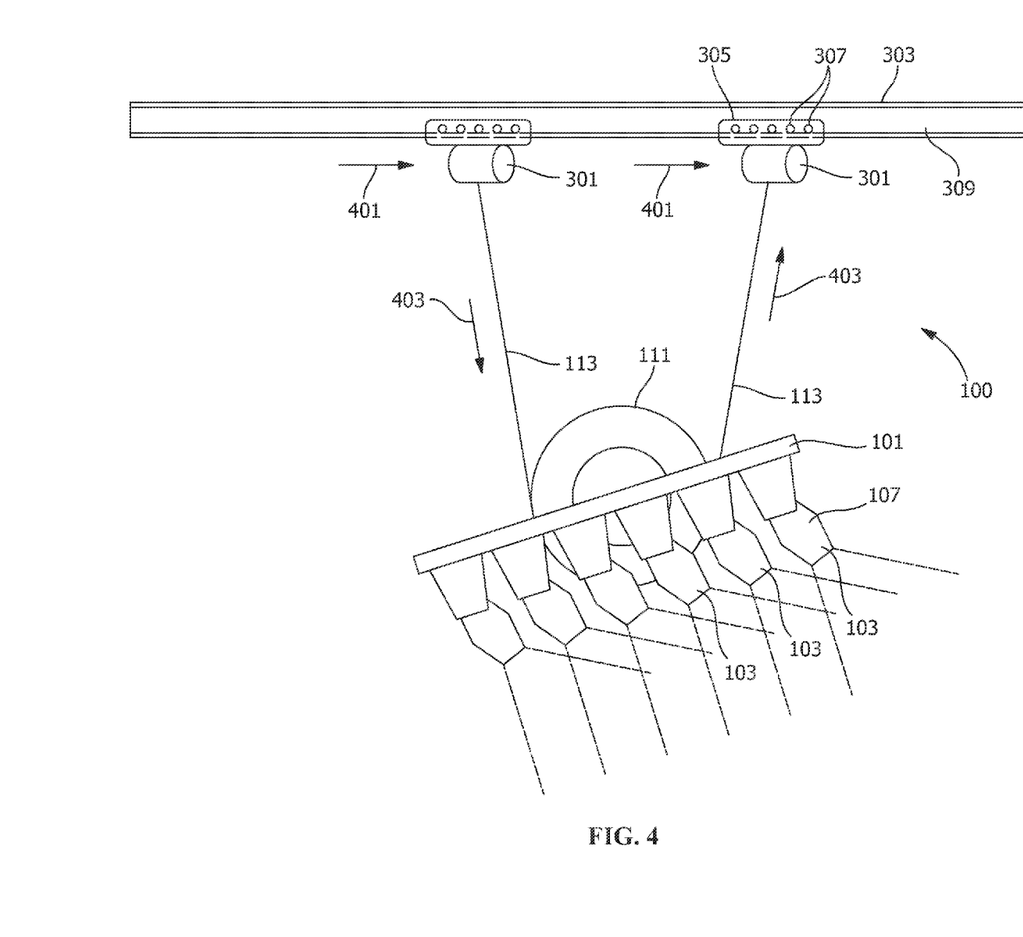
FIG. 4 is a schematic side view of the portable support platform system of FIG. 3 moved to a second position and orientation.
Figure 5:
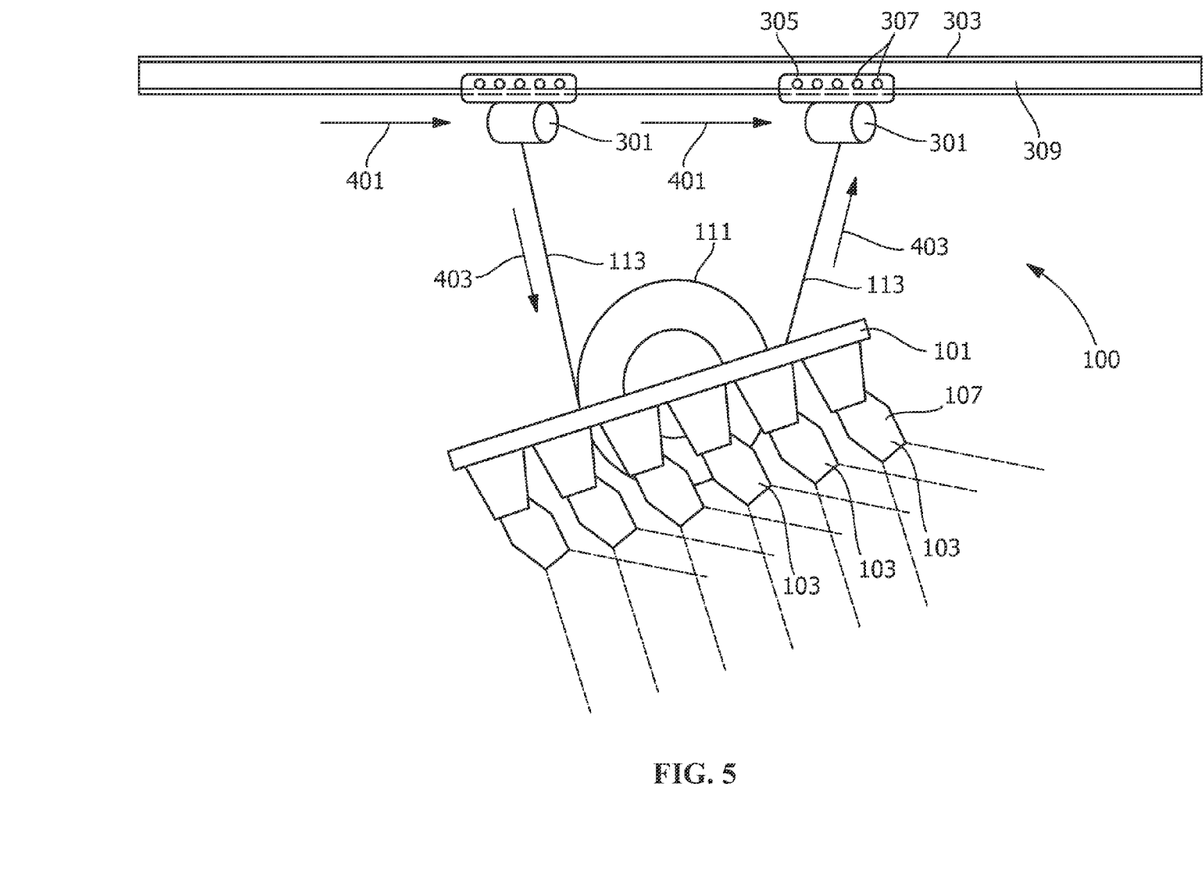
FIG. 5 is a schematic side view of the portable support platform system of FIG. 3 moved to a third position and orientation.

As shown in FIGS. 3-5, lifting devices 301 further include a movable trolley 305 having a set of rolling members 307 that engage a track 309 on architectural member 303. Moveable trolley 305 is movable along track 309 by any suitable method. Track 309 includes, but is not limited to, a groove or surface for which rolling members 307 are permitted to roll, slide or otherwise move to provide movement to the trolley 305. Movement for trolley 305 is provided by any suitable driving mechanism known in the art. Non-limiting examples of movement for trolley 305 include, but are not limited to, free-rolling, winch and/or wire driven, self-propulsion by motors or engines or by any combinations thereof. In one embodiment, track 309 includes a linear track or a predetermined path, such as a curved, circular or serpentine path. Track 309 may also have multiple paths for which trolley 305 may move.

FIG. 4 depicts the movement of trolley 305 in horizontal direction 401 to move support platform 101. In addition, lifting devices 301 are retracting and deploying flexible member 113 in vertical directions 403 to orient support platform 101. While FIGS. 3 and 4 show lifting devices 301 being mounted on moveable trolleys 305, in other embodiments, lifting devices 301 may be mounted in fixed locations along architectural member 303 and provide motion to flexible members 113 in vertical directions 403.

FIG. 5 shows another embodiment wherein lifting devices 301 provide retraction in directions 403 lifting the support platform 101 toward the architectural member 303. The combination of movement in horizontal direction 401 and vertical direction 403 allow positioning and orientation of the support platform 101 and theatrical devices 103 mounted thereon. Motion and positioning of support platform 101 allows positioning and movement of theatrical devices 103 not possible with a fixed mounting arrangement. In addition, the movement and orientation of support platform 101 allows a reproducible show or effect, such as reproducible lighting effects, even in venues that have great variation in configuration. For example, portable support platform system 100 may be installed with the same angle to stage for lighting or sound, regardless of the height of the ceiling or configuration of venue support systems.

Figure 6:
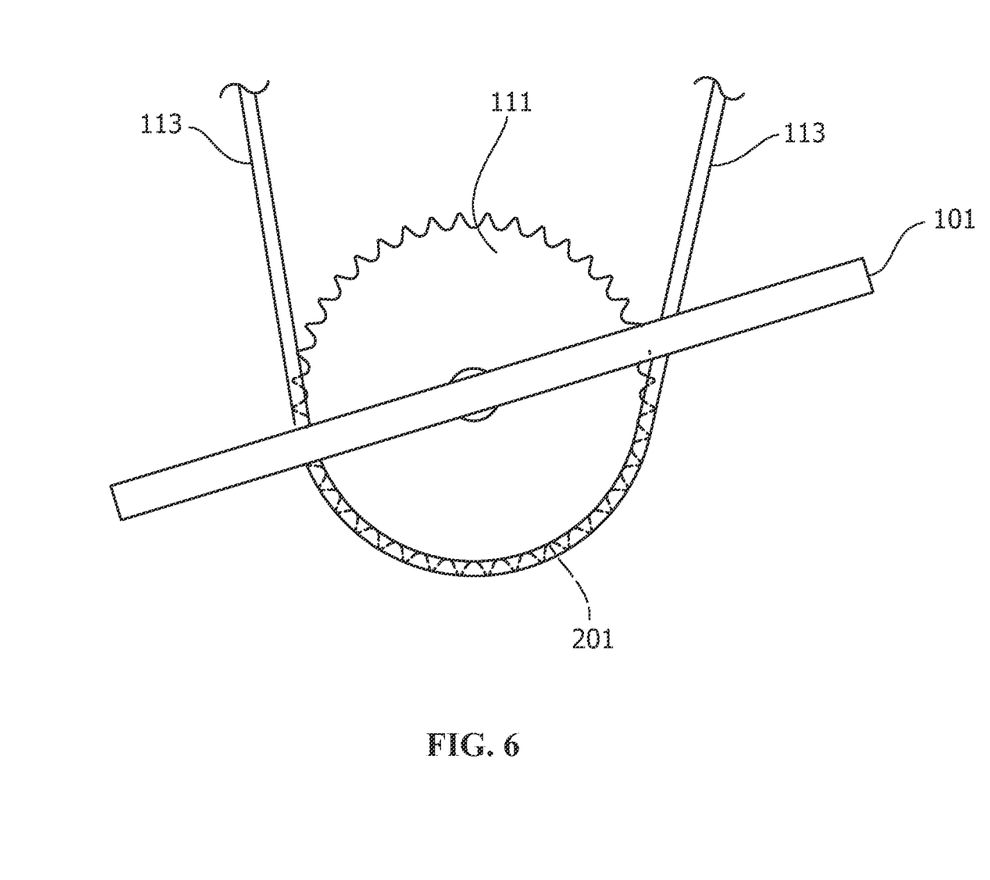
FIG. 6 is a schematic side view of the portable support platform system in accordance with an exemplary embodiment having an alternate orientation member configuration.

FIG. 6 is an alternate embodiment of orientation member 111, wherein orientation member 111 and flexible member 113 are arranged in a sprocket and chain arrangement. In this embodiment, flexible member 113 is a chain that is retracted or deployed by a lifting device (not shown in FIG. 5), such as a chain drive, that orients support platform 101. The sprocket geometry of orientation member 111 mating with the chain provides the fixed attachment between the orientation member 111 and flexible member 113. The embodiment shown in FIG. 6 allows lifting and orientation of large weights and positioning that is controlled and maintained along arcuate surface 201, wherein the sprocket fixedly engages the chain along a substantial portion or all of arcuate surface 201.

Figure 7:
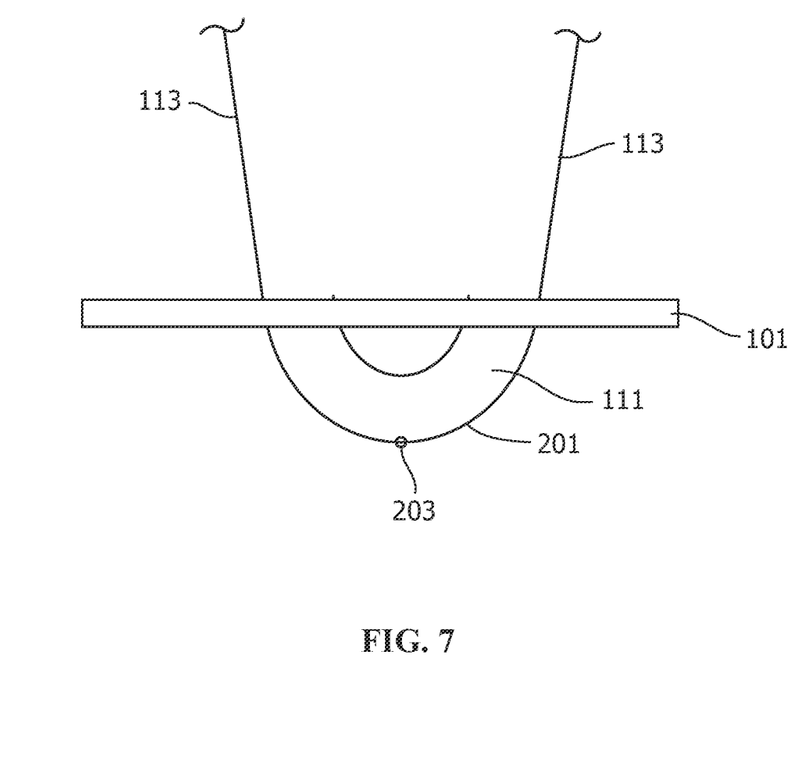
FIG. 7 is a schematic side view of the portable support platform system in accordance with an exemplary embodiment having an alternate orientation member configuration.

FIG. 7 is an alternate embodiment of orientation member 111, wherein orientation member 111 is a semi-circular geometry. In this embodiment, flexible member 113 contacts arcuate surface 201 along substantially the entire rounded portion of the orientation member. The embodiment of FIG. 7 permits a geometry of orientation member 111 that is more compact and more easily stored for transportation and storage.

Figure 8:
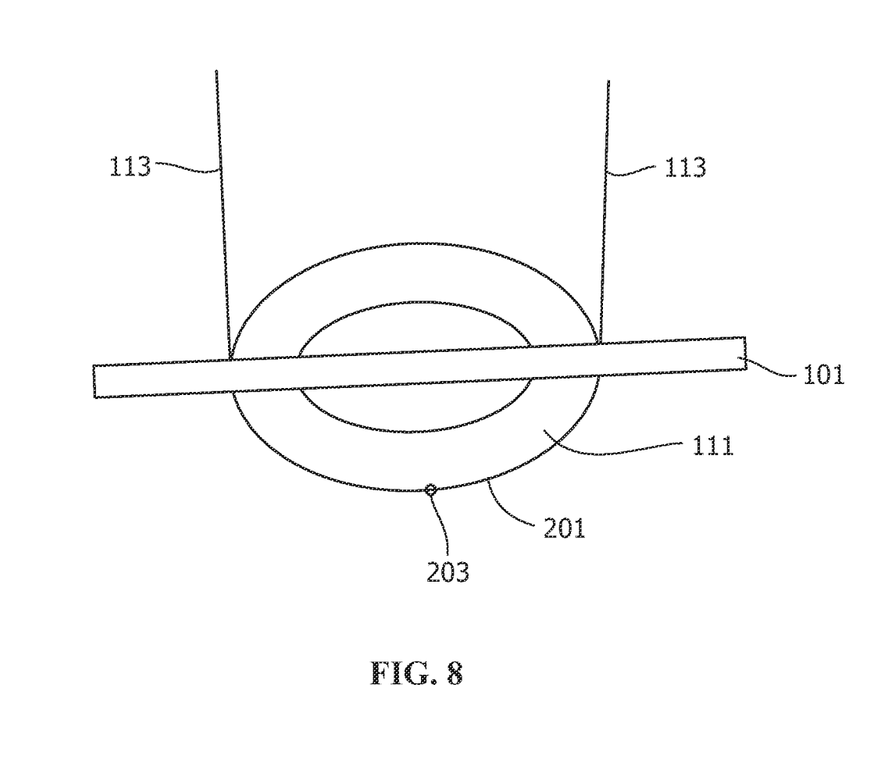
FIG. 8 is a schematic side view of the portable support platform system in accordance with an exemplary embodiment having an alternate orientation member configuration.

FIG. 8 is an alternate embodiment of orientation member 111, wherein orientation member 111 is has a flattened oval geometry. In this embodiment, flexible member 113 contacts arcuate surface 201 along a greater length of the orientation member 111. The embodiment of FIG. 8 provides for a larger surface area for which flexible member 113 contacts orientation member 111 and provides for a greater distribution of the load.

To pack portable support platform system 100 for storage and/or transportation, support platform 101 is lowered to the floor or other suitable surface by deploying flexible members 113. Theatrical devices 103 may be removed or left in place for storage. If theatrical devices 103 require servicing or replacement, theatrical device 103 may be removed and/or replaced for servicing. Flexible members 113 may be removed or remain in place during storage and transportation. Likewise, lifting devices 301 may be packed with or separate from the support platform 101. Support platform 101 and flexible members 113 are loaded into the cargo space of a truck or other transportation vehicle. Support platforms 101 are preferably stackable and arranged to allow protection of theatrical devices 103 during packing and transportation.

Also provided is a method for assembling a portable support platform system 100. Method includes providing portable support platform system 100 described above. Method includes orienting support platform 100 with at least one lifting device 301, lifting device 301 being capable of deploying or retracting flexible members 113, for example, see FIGS. 3-5.

While the foregoing specification illustrates and describes exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A portable support platform system comprising:
a support member, the support member being disposable above a reference surface and to which is affixed at least a pair of theatrical devices each emitting visible emissions and/or audible emissions, at least a portion of such visible emissions or audible emissions each forming a respective beam of emissions having a terminus at one of the theatrical devices, the support member having one end and an opposite end, a longitudinal axis delimited by the pair of ends, and a lateral axis perpendicular to the longitudinal axis, and one of the pair of theatrical devices being affixed to the support member at a spacing from the other of the pair of theatrical devices as viewed relative to the longitudinal axis of the support member, the first theatrical device emitting a beam of visible emissions and/or a beam of audible emissions along a respective emission axis and the second theatrical device emitting a beam of visible emissions and/or a beam of audible emissions along a respective emission axis, and the emission axis of the first theatrical device and the emission axis of the second theatrical device being at a predetermined orientation to one another and the first theatrical device and the second theatrical device being affixed to the support member such that their respective emission axes intercept the reference surface through a range of angular positions of the support member relative to the lateral axis;

an orientation member attached to the support member; and re-orientation reaction member, the re-orientation reaction member being operatively intermediate the support member and a load bearing structure that is at a height above the reference surface greater than the support member such that, as the support member and the thereon affixed theatrical devices is suspended from the load bearing structure, an amount of the load of the support member, ranging from substantially entirely the load up to the entirety of the load, being applied via the re-orientation reaction member on the load bearing structure, and the re-orientation reaction member and the orientation member being in engagement with one another such that a movement of the re-orientation reaction member is transmitted via the orientation member to the support member in a manner that effects a re-orienting shift of the support member about its the lateral axis from a starting angular position to a new angular position of the support member relative to the lateral axis, the shift of the support member about the lateral axis changing the height of the first theatrical device relative to the height of the second theatrical device, as measured relative to the reference surface under a measurement condition in which this change in the relative heights of the first theatrical device and the second theatrical device is to be measured subject to the stipulation that the emission axis of the first theatrical device and the emission axis of the second theatrical device maintain the same predetermined orientation to one another both at their respective dispositions at the starting angular position of the support member before the re-orienting shift of the support member and at their respective dispositions after the re-orienting shift of the support platform, and the respective emission axes of the first theatrical device and the second theatrical device intercepting the reference surface at both the starting angular position of the support member and the new angular position of the support member.

2. The portable support platform system of claim 1, wherein the orientation member includes a generally arcuate surface, the re-orientation reaction member is a flexible member operable to flexibly conform to the generally arcuate surface of the orientation member as the flexible member is moved, and the first theatrical device and the second theatrical device are each affixed to the support member in a manner in which each theatrical device is individually adjustably re-positionable relative to the support member, wherein a given orientation of the emission axis of the first theatrical device and the emission axis of the second theatrical device to each other, or a given pair of orientations of both the first theatrical device and the second theatrical device to the support member, can be changed via adjusting the position of one or both of the first theatrical device and the second theatrical device relative to the support member.

3. The portable support platform system of claim 2, wherein the re-orientation reaction member is attached to a moveable trolley.

* * * * *